(12) United States Patent
Rosman et al.

(10) Patent No.: US 8,173,917 B2
(45) Date of Patent: *May 8, 2012

(54) ACTUATING DEVICE ON A VEHICLE STEERING WHEEL

(75) Inventors: Bojan Rosman, Stuttgart (DE);
Hans-Uwe Baumann, Stuttgart (DE);
Norbert Schote, Ammerbuch (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 457 days.

This patent is subject to a terminal disclaimer.

(21) Appl. No.: 12/432,787

(22) Filed: Apr. 30, 2009

(65) Prior Publication Data

US 2009/0272218 A1 Nov. 5, 2009

(30) Foreign Application Priority Data

Apr. 30, 2008 (DE) .......................... 10 2008 022 544

(51) Int. Cl.
*H01H 9/06* (2006.01)

(52) U.S. Cl. .................................... 200/61.88

(58) Field of Classification Search .................. 200/345, 200/61.27, 61.54–61.57
See application file for complete search history.

(56) References Cited

U.S. PATENT DOCUMENTS

| 5,756,950 A * | 5/1998 | De Filippo ................. 200/61.54 |
| 6,268,576 B1 * | 7/2001 | Onodera .................... 200/61.54 |
| 6,586,692 B2 | 7/2003 | Agetsuma |
| 7,129,431 B2 * | 10/2006 | Ichimura et al. ........... 200/61.54 |
| 7,762,159 B2 * | 7/2010 | Takahashi et al. .............. 74/552 |
| 2009/0014294 A1 * | 1/2009 | Rosman et al. ............ 200/61.88 |

FOREIGN PATENT DOCUMENTS

| DE | 10 2004 060 232 A1 | 6/2006 |
| EP | 0 941 886 A2 | 9/1999 |
| EP | 1 211 119 A2 | 6/2002 |

* cited by examiner

*Primary Examiner* — Edwin A. Leon

(57) ABSTRACT

An actuating device contains two shifting buttons which are arranged on the upper side and lower side of the steering wheel. The shifting buttons are guided together rectilinearly on guide pins during a shifting operation, which guide pins are held in sleeves of a supporting plate and are fastened to a steering wheel cover.

24 Claims, 5 Drawing Sheets

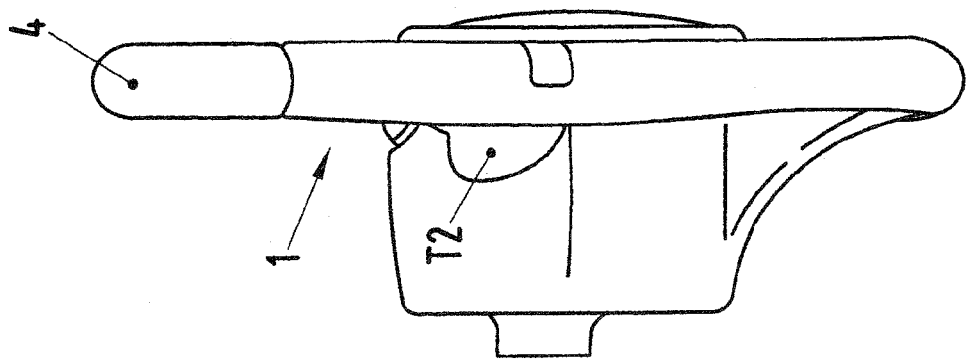
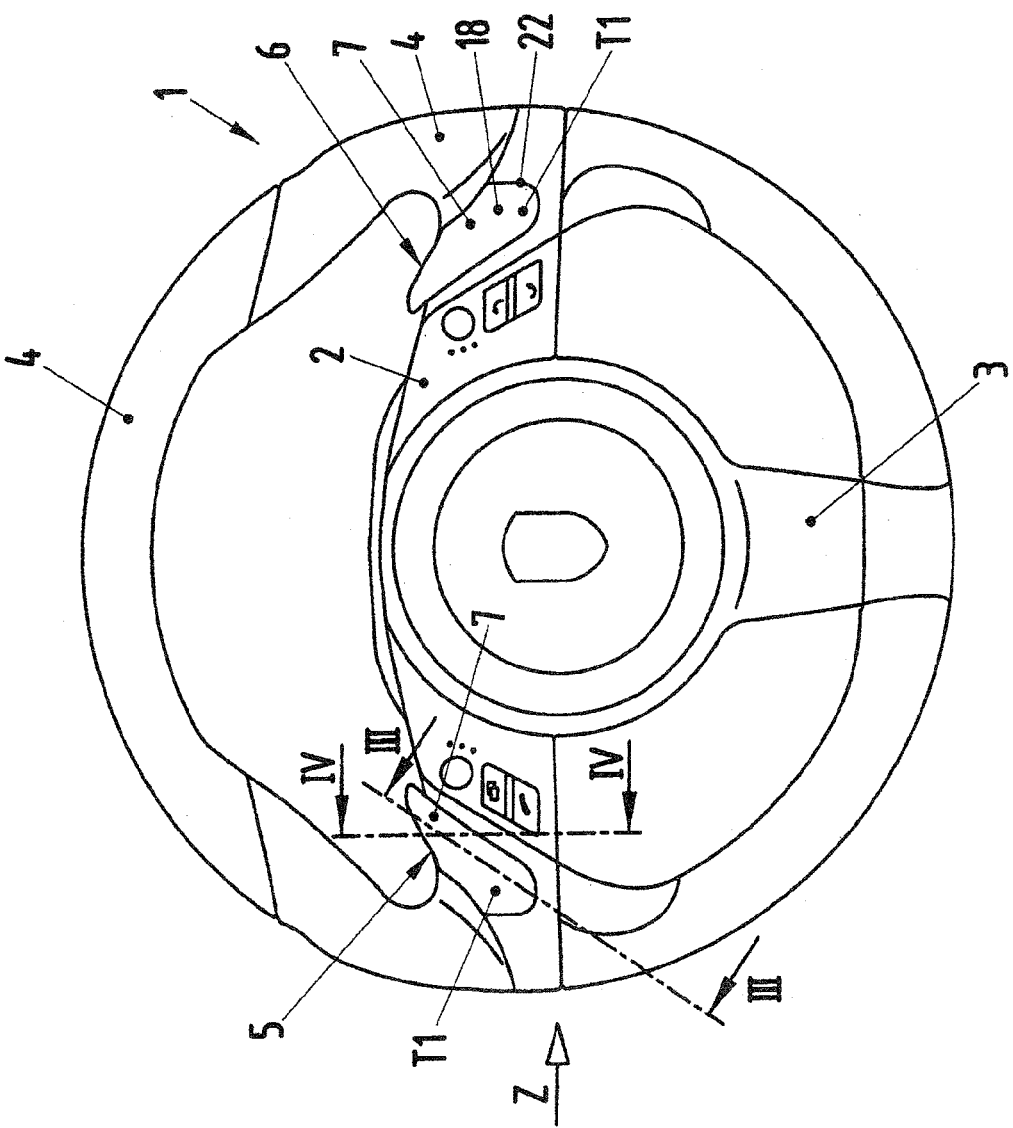

ACTUATING DEVICE ON A VEHICLE STEERING WHEEL

CROSS-REFERENCE TO RELATED APPLICATION

This application claims the priority, under 35 U.S.C. §119, of German application DE 10 2008 022 544.4, filed Apr. 30, 2008; the prior application is herewith incorporated by reference in its entirety.

BACKGROUND OF THE INVENTION

Field of the Invention

The invention relates to an actuating device on a vehicle steering wheel.

European patent EP 0 941 886 B1 discloses an actuating device for a vehicle transmission on a steering wheel of a motor vehicle, in which actuating device a shifting device for shifting the transmission is arranged on a front side and a further shifting device is arranged on a rear side of the steering wheel.

SUMMARY OF THE INVENTION

It is accordingly an object of the invention to provide an actuating device on a vehicle steering wheel which overcomes the above-mentioned disadvantages of the prior art devices of this general type, which actuating device ensures optimum operation on the steering wheel and additionally ensures a configuration with a low mounting expenditure.

The advantages achieved with the invention include the fact that an actuating device is produced from two assembled housing halves which at the same time form what are known as shifting buttons which act on electric shifting elements, and a dual clutch transmission can therefore be actuated. There is provision according to the invention, in particular, for the actuating device to contain two shifting buttons which are connected to one another via guide pins, are arranged opposite one another, are formed in each case from at least one housing half and are mounted via the guide pins in a stationary supporting plate in such a way that both shifting buttons can be adjusted jointly at least for shifting, the guide pins being arranged in a linear guidance configured for guiding the guide pins in a straight line. As a result of this configuration of the actuating device, pressure exertion on the shifting buttons achieves a rectilinear movement and therefore brings about a shifting operation of the dual clutch transmission. Extremely small gap sizes can be maintained as a result of the linear guidance of the guide pins, which is of great importance with regard to the space utilization and visual appearance in the steering wheel region.

The advantageously electric or electronic shifting elements for shifting the dual clutch transmission contain what are known as elastically resilient shifting mats which are arranged opposite electric shifting elements on the supporting plate.

The selector buttons are arranged so as to interact in each case with selector elements. Here, at least idle travel is preferably provided between a selector button and the respectively assigned at least one selector element. The provision of idle travel before the actual pressure point of the selector element prevents faulty actuation in a functionally appropriate manner.

In order that a rectilinear movement of the two shifting buttons is ensured, the guide pins are arranged displaceably with their free ends in each case in sleeve-like receptacles of the housing halves and in the central region in each case in a sleeve of the supporting plate together with the housing halves. This ensures guiding of the shifting buttons, even if pressure is exerted on different surface regions of the shifting buttons.

In order that jamming of the shifting buttons is counteracted, one of the guide pins is mounted in a brass bush which has a defined length and is inserted into the sleeve or in a bush having a linear ball bearing and the further guide pin is mounted in a slotted receptacle of the sleeve. Moreover, the brass bush brings about a satisfactory sliding property having low friction. This achieves a situation where the guide pin in the brass bush assumes the function of main guidance and the further guide pin assumes the function of the antirotation safeguard. A plastic bush is also conceivable instead of the brass bush.

The shifting button on the upper side of the steering wheel can be configured for an upshift or downshift of the dual clutch transmission and the shifting button which is arranged below it can be configured for a downshift or upshift. That is to say, the configuration of the shifting buttons can be configured in such a way that the upper shifting button is configured for a downshift and the lower shifting button is configured for an upshift or vice versa.

There is provision for the upper shifting button to be inserted into a U-shaped recess of the steering wheel cover and to be configured congruently with an edge region of the steering wheel cover, and for an adjoining face region to be configured so as to fall away obliquely and for an exposed region of the shifting button which is not enclosed by the recess to protrude freely in front of the steering wheel cover, which region is guided together with a corresponding region of the lower shifting button. This achieves an upper shifting button which is adapted virtually congruently to the steering wheel cover, which ensures satisfactory operability. The surface regions of both the upper and lower shifting buttons are configured haptically in such a way that optimum operability is ensured in every position of the steering wheel.

Other features which are considered as characteristic for the invention are set forth in the appended claims.

Although the invention is illustrated and described herein as embodied in an actuating device on a vehicle steering wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, front elevational view of a steering wheel having actuating devices according to the invention;

FIG. 2 is a side view of the steering wheel;

DETAILED DESCRIPTION OF THE INVENTION

Figure 3:
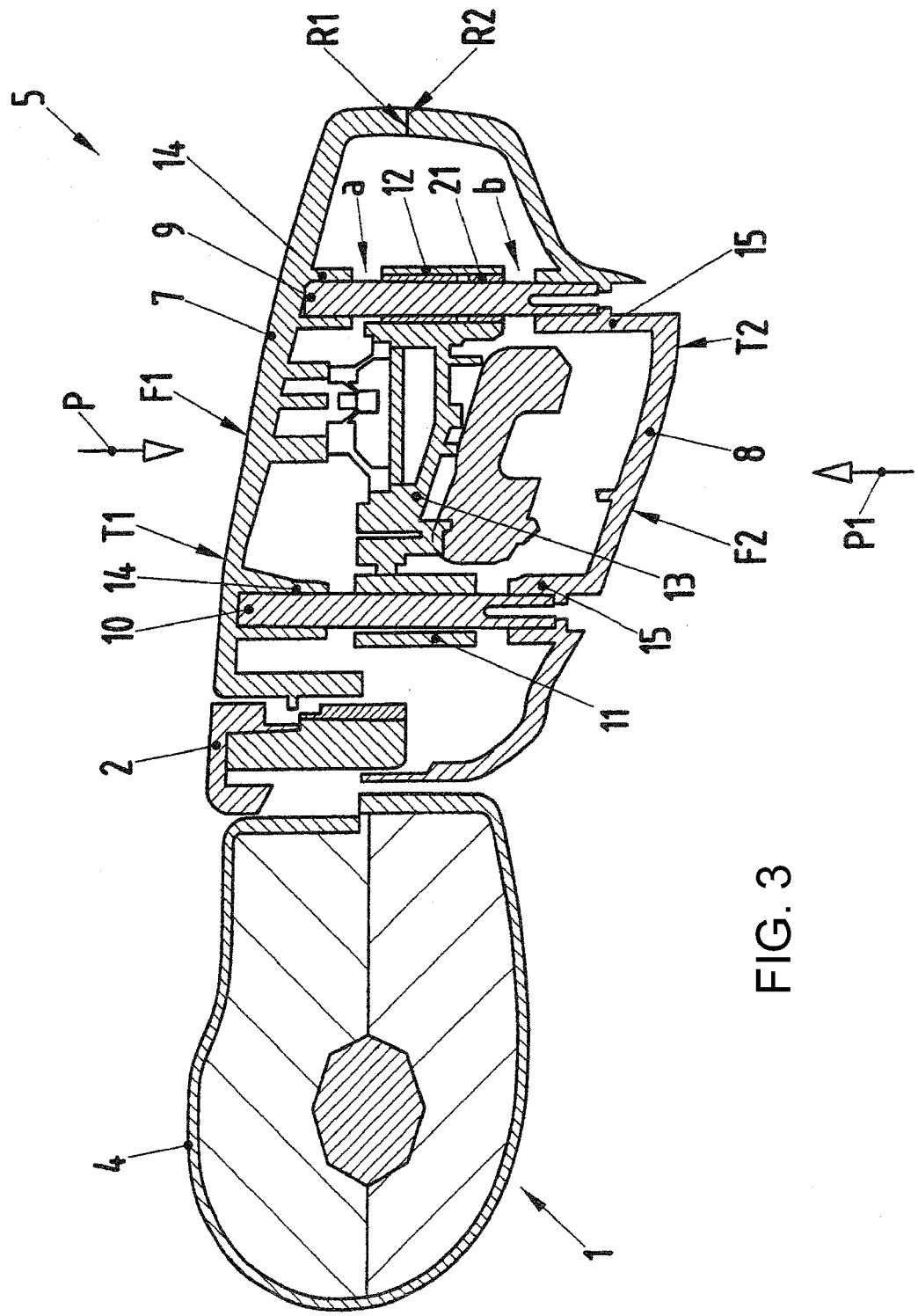
FIG. 3 is a sectional view taken along the line III-III shown in FIG. 1.

Referring now to the figures of the drawing in detail and first, particularly, to FIG. 1 thereof, there is shown a steering wheel cover 3 fixed to a steering wheel 1, which steering wheel cover 3 has in each case an actuating device 5, 6 in a transverse web 2 close to a steering wheel rim 4 for shifting a dual clutch transmission, for example.

The actuating devices 5, 6 contain at least two housing halves 7, 8 which are configured as what are known as shifting buttons T1 and T2 having haptic actuating faces F1 and F2 (FIG. 3). The housing halves 7, 8 are connected to one another via guide pins 9, 10 which are held displaceably in guide sleeves 11, 12 of a supporting plate 13. The guide pins 9, 10 are held at their ends in a firmly inserted manner in each case in integrally formed inner sleeve-like receptacles 14, 15 of the housing halves 7, 8. Spacings a and b which permit the shifting movements are provided between the free ends of the housing receptacles 14, 15 and guide sleeves 11, 12 of the supporting plate 13.

One guide pin 9 is mounted in a brass bush 21 or in a bush which is coated with brass in the sleeve 12, as a result of which improved smooth running is achieved during the actuation of the shifting buttons T1 and T2. The length of the brass bush 21 defines nonjamming of the guide pin 9 in the bush 21. The further guide pin 10 can be displaced in the sleeve 12 of the supporting plate 13 within a slot, as a result of which play is achieved and jamming is avoided. A sleeve having an inner linear ball bearing can also be used instead of the brass bush 21.

Figure 4:
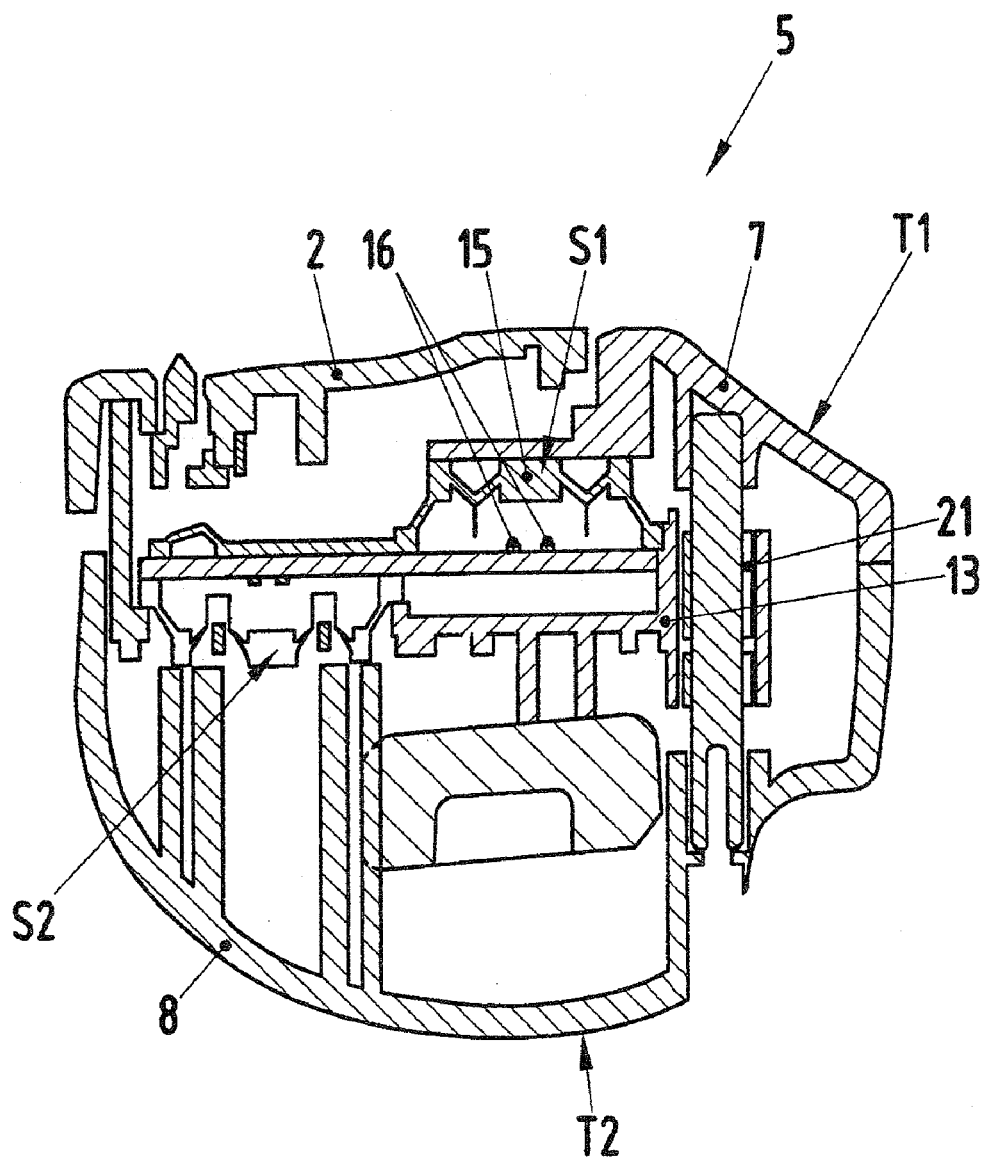
FIG. 4 is a sectional view taken along the line IV-IV shown in FIG. 1.

The two housing halves 7, 8 lie on one another in a supporting manner in an edge region R1 and R2 and are held via elastic shifting mats S1 and S2 in what is known as a neutral position, in which the spacings a and b prevail, as shown in greater detail in FIG. 3 on the example of an actuating device 5. FIG. 4 also shows the better general view of half of only one actuating device 5 by way of example.

During an actuation of the upper shifting button T1 for an upshift of the dual clutch transmission by pressure actuation in arrow direction P, a contact block of an elastic shifting mat is pressed against electric contacts 16. During an actuation of the lower shifting button T2 in arrow direction P1, an identical process takes place as in the case of the upper shifting button T1. In every case, the two housing halves 7 and 8 which form the shifting buttons T1 and T2 are guided jointly via the guide pins 9, 10 in a rectilinear movement in the sleeves 11, 12 of the supporting plate 13 during an actuation of one shifting button T1 or T2.

The housing halves 7, 8 are arranged in a U-shaped recess 22 of the steering wheel cover 3, an edge region 17 of the housing half 7 or the upper shifting button T1 being arranged congruently with the steering wheel cover 3. In contrast, an adjoining face region 18 is configured so as to fall away obliquely. A front region of the shifting button T1 and T2 is exposed, is not enclosed by the recess 22, is arranged so as to protrude freely in front of the steering wheel cover 3 and is guided together with a corresponding region of the lower shifting button T2. The surfaces of the shifting buttons T1 and T2 are configured as haptic operating faces.

Figure 6:
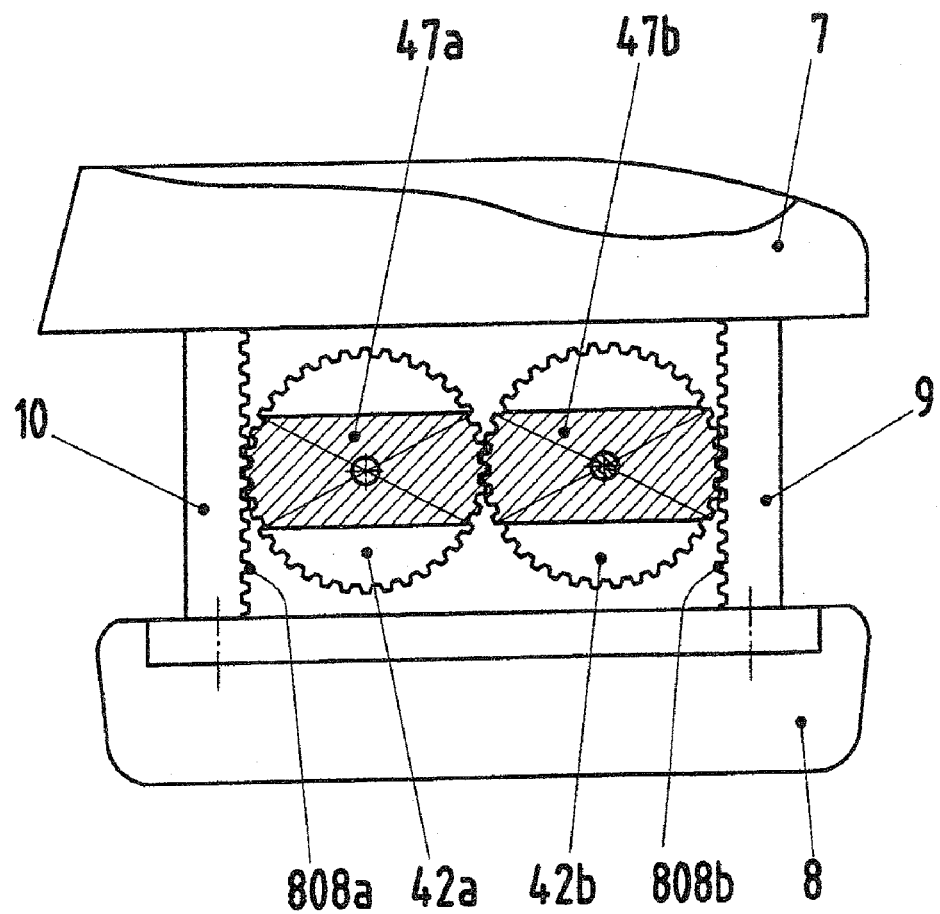
FIG. 6 is a diagrammatic view of guide pins with a toothing system and also of gearwheel elements.

FIG. 6 shows an exemplary embodiment, in which the guide pins 9, 10 have a toothing system 808b, 808a on their side which is assigned to the respective other guide pin 10, 9. The toothing systems 808a, 808b of the guide pins 10, 9 can be integral constituent parts of the guide pins 10, 9 and can be molded onto them, for example. As an alternative, the toothing systems 808b, 808a can also be fastened to the guide pins 9, 10. Gearwheel elements are arranged as drivers between the guide pins 9, 10. The gearwheel elements can be configured, for example, as gearwheels 42a, 42b. As an alternative, it is also possible that the gearwheel elements are configured as toothed pulleys 47a, 47b. The toothed pulleys 47a, 47b are indicated in the drawing by hatching. The use of toothed pulleys of this type is distinguished in comparison with the use of gearwheels 42a, 42b by lower weight and advantages with regard to the installation space. The use of gearwheel elements makes particularly reliable guidance of the housing halves 7, 8 possible, it being possible for additional guide elements, such as sleeves, to be omitted. The guide pins 9, 10 can but do not have to be guided exclusively by the gearwheel elements. The freedom of play of the arrangement is ensured by a slight oversize and defined elasticity properties.

Figure 5:
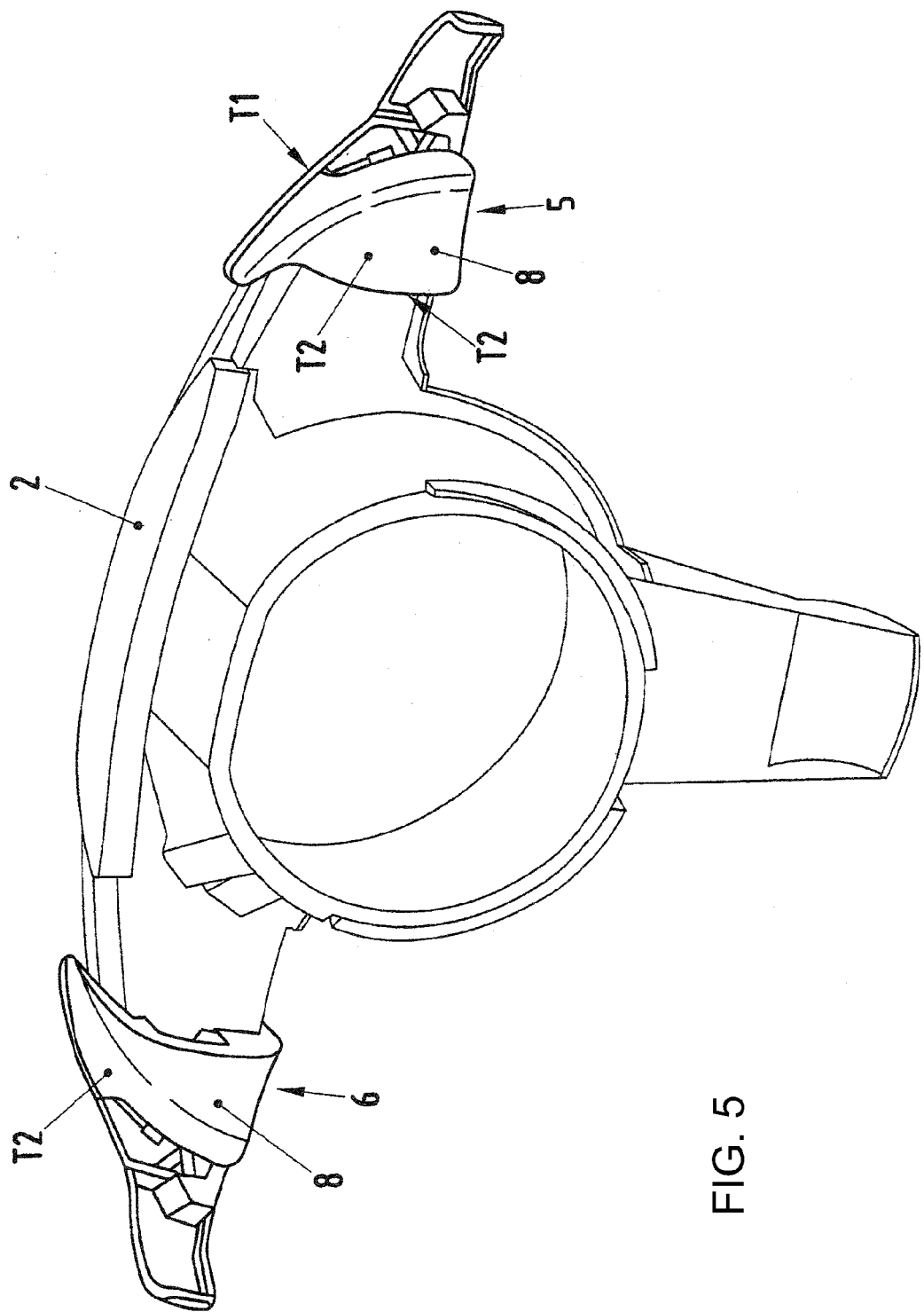
FIG. 5 is a rear, perspective view of a steering wheel cover having a connected supporting plate and actuating devices.

At least one lamp can be provided between the housing halves 7, 8, in particular in an arrangement as shown in FIGS. 4 and 5. One or both selector buttons T1, T2 of an actuating device 5, 6 can be illuminated from inside with the aid of the at least one lamp. A shifting point display can be provided in this way. The lamp can illuminate to indicate the shifting point if a favorable moment for shifting is to be signaled to the driver. A display which signals to the driver to shift up or down at the correct moment can be provided with the aid of color coding and/or corresponding symbols.

In order to improve the operating comfort, the housing halves 7, 8 can be configured so as to reach around the transverse web 2 of the steering wheel (see, in particular, FIG. 1, but not shown in greater detail). As an alternative or in addition, the housing halves 7, 8 can be arranged in the region of the steering wheel rim 4. Here, the housing halves 7, 8 can be configured so as to reach around the steering wheel rim 4 at least partially.

The invention claimed is:

1. An actuating device on a vehicle steering wheel, the actuating device comprising:
   a linear guidance device;
   a stationary supporting plate;
   guide pins; and
   two shifting buttons connected to one another via said guide pins, said two shifting buttons disposed opposite one another, are formed in each case from at least one housing half and are mounted via said guide pins in said stationary supporting plate such that said two shifting buttons can be adjusted jointly for shifting, said guide pins disposed in said linear guidance device configured for guiding said guide pins in a straight line.

2. The actuating device according to claim 1, wherein each of said guide pins has a side with a toothing system which is assigned to a respective other said guide pin, each of said toothing systems has a gearwheel element and of each of said guide pins is coupled to one another via said gearwheel elements.

3. The actuating device according to claim 2, wherein said gearwheel elements are two gearwheels which engage into one another.

4. The actuating device according to claim 2, wherein said gearwheel elements are two toothed pulleys which engage into one another.

5. The actuating device according to claim 1, further comprising linear ball bearings and said guide pins are guided by linear ball bearings.

6. The actuating device according to claim 1, wherein said housing halves are disposed in a region of a steering wheel rim.

7. The actuating device according to claim 1, wherein said housing halves are configured so as to reach around a transverse web of the steering wheel.

8. The actuating device according to claim 1, further comprising at least one lamp disposed between said housing halves for illuminating at least one of said shifting buttons being an upper selector button.

9. The actuating device according to claim 8, wherein said at least one lamp is a shifting point display.

10. The actuating device according to claim 1, further comprising selector elements and said shifting buttons are disposed so as to interact in each case with said selector elements, an idle travel being provided between said shifting button and a respectively assigned at least one said selector element.

11. The actuating device according to claim 1, further comprising electric shifting elements, said shifting buttons are for shifting transmission stages of a dual clutch transmission and are disposed in each case so as to lie opposite said electric shifting elements.

12. The actuating device according to claim 11, further comprising an elastically resilient shifting mat having a contact face, said electric shifting elements are connected to said stationary supporting plate which is disposed so as to correspond to said elastically resilient shifting mat.

13. The actuating device according to claim 12, wherein:
said housing halves have sleeve-shaped receptacles formed therein;
said supporting plate having sleeves with a central region; and
said guide pins have free ends and are disposed displaceably with said free ends in each case in said sleeve-shaped receptacles of said housing halves and in said central region in said sleeves of said supporting plate together with said housing halves.

14. The actuating device according to claim 13,
wherein one of said sleeves has a slotted receptacle formed therein; and
further comprising a brass bush inserted in one of said sleeves, one of said guide pins is mounted displaceably in said brass bush and a further of said guide pins is mounted displaceably in said slotted receptacle of said sleeve.

15. The actuating device according to claim 1, wherein said two shifting buttons can be adjusted jointly with respect to said supporting plate via said guide pins.

16. The actuating device according to claim 1, wherein said shifting buttons include an upper shifting button configured for an upshift or downshift of a dual clutch transmission and a lower shifting button configured for a downshift or upshift of the dual clutch transmission.

17. The actuating device according to claim 16, wherein said upper shifting button is inserted into a U-shaped recess of the steering wheel cover and is configured congruently with an edge region of the steering wheel cover, said upper shifting button having an adjoining face region configured so as to fall away obliquely and an exposed region of said upper shifting button which is not enclosed by the recess protrudes freely in front of the steering wheel cover, said exposed region is guided together with a corresponding region of said lower shifting button.

18. The actuating device according to claim 17, wherein said adjoining face region which falls away is configured as a haptic bearing face for a finger of an operator.

19. The actuating device according to claim 16, wherein said lower shifting button is disposed such that it is recessed in one of the steering wheel and a steering wheel spoke and has a haptic bearing face for a finger of an operator.

20. The actuating device according to claim 16, wherein said upper shifting button together with said lower shifting button forms a housing-shaped structural unit, and are supported mutually on at least one side on opposite edges.

21. The actuating device according to claim 13, wherein said shifting buttons perform a common rectilinear shifting movement under an exertion of pressure by said guide pins which are guided in said sleeves of said supporting plate.

22. The actuating device according to claim 13, further comprising fastening means, said supporting plate is held on an inside of a steering wheel cover via said fastening means, together with said sleeves for said guide pins.

23. The actuating device according to claim 5, further comprising a sleeve having one of said linear ball bearings as an inner linear ball bearing and one of said guide pins is guided in said sleeve, said one guide pin being made from stainless steel or has a hard surface.

24. The actuating device according to claim 1, wherein the actuating device is for shifting a dual clutch transmission.

* * * * *